Feb. 5, 1929.                                               1,701,322
C. G. EDWARDS
COUNTER THRUST PRESSURE MOTOR
Filed Nov. 14, 1927
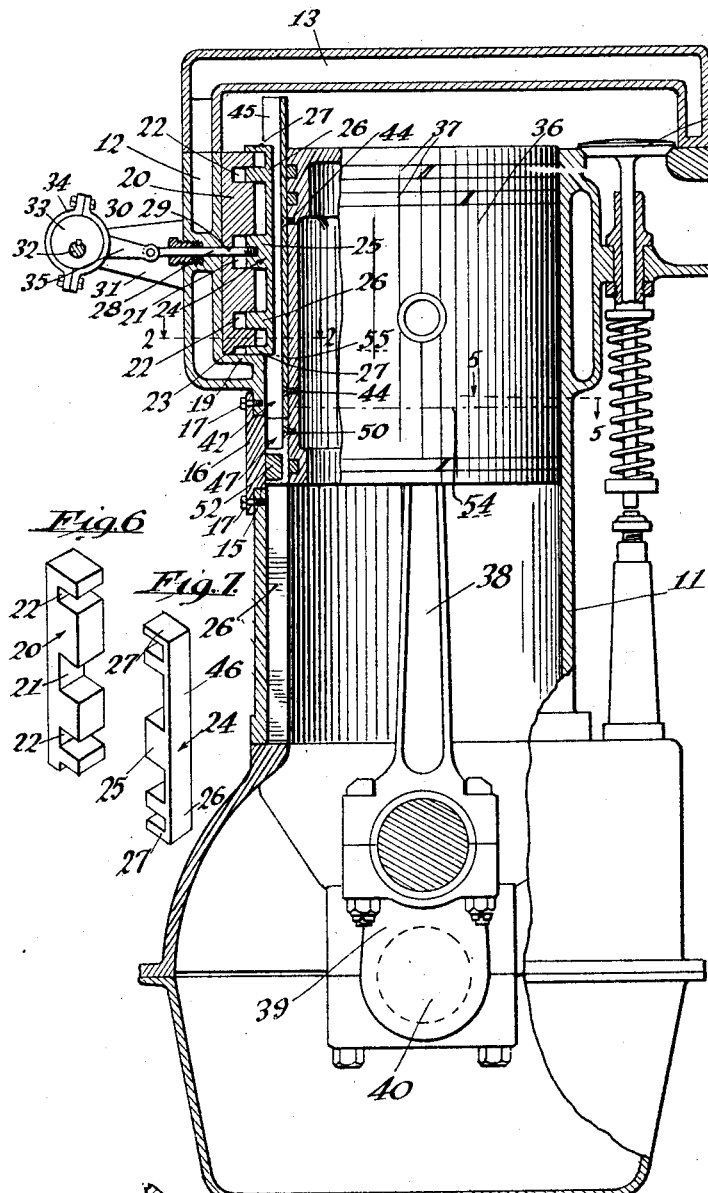
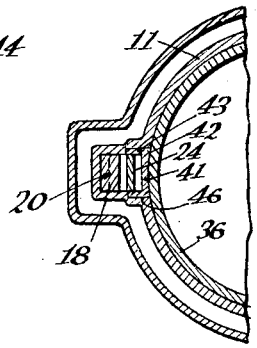
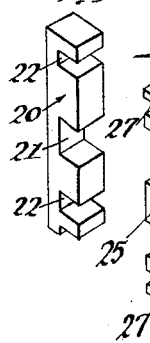
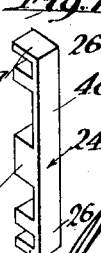
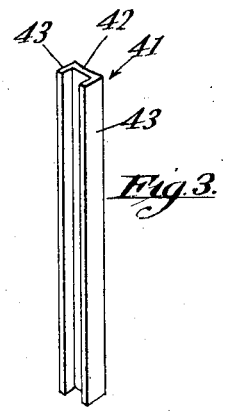
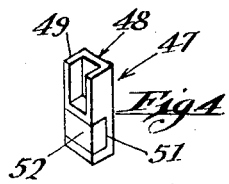
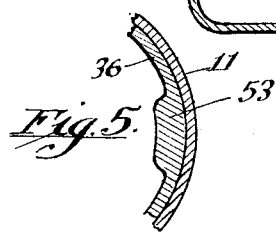
Inventor
Clarence G. Edwards
by Hazard and Miller
Attorneys.

Patented Feb. 5, 1929.

1,701,322

UNITED STATES PATENT OFFICE.

CLARENCE G. EDWARDS, OF LOS ANGELES, CALIFORNIA.

COUNTER-THRUST-PRESSURE MOTOR.

Application filed November 14, 1927. Serial No. 233,140.

My invention is a counter thrust for pressure motors of the type illustrated in my patent application, Serial No. 111,297, for a counter thrust pressure motor, filed May 24, 1926.

An object of my invention is in certain improvements in the construction of design of a motor of the type set forth in my application above mentioned, and this construction is adapted to equalize and restrict to a certain extent the lateral pressure on the piston during the power stroke.

Another object of my invention is to give a positive positioning of the elongated gate inside of the cylinder in reference to the piston, so that the amount of opening of this gate or distance of the gate from the piston may be regulated in accordance with the speed of the engine or the amount of power fluid required to operate the engine.

Another improvement of the present application comprises providing a cylinder with a hand hole to allow access to the packing closure block attached to the piston so that this may be examined and replaced without requiring removal of the piston from the cylinder.

The various features of my invention will be more readily understood from the following description and drawings, in which:

Figure 1 is a vertical diametrical section through an engine constructed in accordance with my invention showing the piston and connecting rod in elevation partly broken away.

Fig. 2 is a detail horizontal section on the line 2—2 of Fig. 1 in the direction of the arrows.

Fig. 3 is a perspective view of the hanger for attachment to the piston.

Fig. 4 is a perspective view of the packing closure block.

Fig. 5 is a detail cross section on the line 5—5 of Fig. 1 in the direction of the arrows.

Fig. 6 is a perspective view of the removable block.

Fig. 7 is a perspective view of the gate interfitting with such block.

My invention, as in my prior application, is illustrated in connection with an internal combustion motor, in which the cylinder is designated by the numeral 11, having an upper part 12 for the water jacket, and illustrating a detachable head 13 also with a water jacket. The engine has poppet valves 14 of the usual character for inlet and exhaust gases. The cylinder is provided with an opening 15 forming a hand hole to which is secured a closure plate 16, this being attached by a screw 17, the purpose of this construction being as hereunder set forth. The cylinder in the upper portion 12 is provided with a longitudinally extending channel 18, this ending in a shoulder 19.

A removable block 20 is fitted in this channel and has a central recess 21, upper and lower recesses 22 and a notch 23 adjacent the bottom. Fitting over the removable block and in the channel 18 there is an elongated gate 24 which has a central internal lug 25 fitting in the recess 21 of the removable block 20 and having upper and lower bearing horns 26 fitting in the recesses 22 and end horns 27, the upper one fitting on top of the removable block and the other fitting in the notch 23.

A spindle 28 is connected to the lug 25 and extends through an opening 29 in the removable block and the upper portion 12 of the cylinder, there being a packing gland 30 to make this leak-proof. A bracket 31 is secured to the side of the upper portion of the cylinder and has a rotatable shaft or rod 32 fitted therein. To this rod there is keyed an eccentric 33 and on the eccentric is an eccentric strap 34 having a pitman 35 pivotally connected to the stem 28.

A rotatable or rocking shaft 32 may be connected to a suitable mechanism connected to the throttle or be controlled by a speed indicator of suitable kind, such as a centrifugally operated indicator, the object of rotating the shaft being to thrust the gate inwardly towards the center of the cylinder or retract this outwardly in accordance with the amount of fuel being used in the engine, or in accordance with the speed of the engine, so as to decrease or increase the gas passage through the channel.

The piston 36 is provided with the usual piston rings 37 and connected to a connecting rod 38, this latter being attached to a crank 39 driving a crank shaft 40. The piston is provided with a hanger 41, this hanger being in the form of a channel and having a web 42 with side flanges 43. The web has an arcuate curve conforming to the curvature of the piston, and the hanger is secured to the piston by bolts 44 or the like. It will be noted that the upper end 45 of the hanger projects above the top of the piston for a purpose hereunder set forth. The flanges 43 of the hanger work in longitudinal canals 46 in the channel 18, this forming the inner portion of the upper part of the channel, as shown in Fig. 2, and the lower portion extending to the bottom of the stroke of the piston.

The packing closure block 47 is illustrated as having a web 48 with side flanges 49, the web being curved to conform to the piston, and this is secured to the piston by bolts 50. The lower part of this block has a transverse groove 51 in which is placed a packing 52.

The purpose of the removable hand hole plate 16 is to allow access to the packing closure block 47 so that it may be inspected and removed and replaced without removing the piston from the cylinder.

The piston is provided with a counterbalance weight 53 cast therein on the side opposite the hanger 41 and the block 47, this being to counterbalance the weight of these parts; and it is intended that this may be drilled out or filed away to get an exact counterbalance.

The manner of operation and functioning of my engine is substantially as follows:

My construction is particularly adapted for long stroke pistons and in the present instance this is shown in full lines at the top of the stroke, the top of the piston at the bottom of the stroke being indicated by the numeral 54, and the top of the upper end 45 of the hanger then occupies a position indicated by the line 55 which, it will be seen, is closely adjacent the lower edge of the slidable gate 24. Therefore, when the piston is at the lowest part of its stroke, the hanger prevents an excess amount of gas from blowing down between the piston and the gate. In other words, this upward extension of the hanger restricts the amount of gas which could blow downwardly, for if the hanger terminated at the top of the piston, there would be a wide space between the piston and the gate when the piston was at the bottom of its stroke and positioned adjacent thereto.

In the reciprocation of the engine the rock shaft 32, as above mentioned, may be controlled by a throttle or by a speed indicator or regulator such as a governor, and this may be arranged so that when the engine is operating slowly the shaft is rocked in such a direction as to draw outwardly on the stem 28, thus drawing the gate 24 outwardly and giving a larger passage for the flow of gas in the channel 18 and the canal 46. Hence, when the engine is working the hardest, there is greater space for the products of combustion between the cylinder and the piston on the side having the channel and canal, and this pressure acts on the packing closure block, giving additional force on the side of the piston which bears against the side of the cylinder on the power stroke. When the engine is running fast the rock shaft 32 may be connected either to a throttle or to a speed governor, or the like, so that the gate 24 will be moved inwardly, thereby restricting the passage for gas in the channel 18 and the canal 46. Hence, when the engine is running free and not having such an excessive side thrust at each stroke, the amount of pressure of the products of combustion on such side is restricted.

It will be apparent from the above description that the packing in the closure block 47 may be readily inspected by removing the hand hole plate 16 and this may be replaced when necessary without removing the piston from the cylinder.

It will also be understood that the piston may be correctly balanced by removing some of the surplus metal, as indicated at 53, or adding metal thereto in known manners, and therefore the piston may be accurately counter balanced.

Various changes may be made in the principles of my invention without departing from the spirit thereof, as set forth in the description, drawings and claims.

I claim:

1. A motor having a cylinder, a piston reciprocable therein, there being a passage at one side of the cylinder between the cylinder and the piston to allow entrance of explosive gas, and means to positively vary the cross sectional area of such passage.

2. A motor having a cylinder and a piston, there being a passage between the cylinder and the piston on one side with a pressure block on the piston operating in such passage, and means positively operative to increase or decrease the cross sectional area of such passage.

3. A motor having a cylinder and a piston, the cylinder having a longitudinal passage, the piston having a pressure block secured to one side and slidable in such passage, a gate mounted in the cylinder, and means to positively shift such gate to increase or decrease the cross sectional area of the passage.

4. A motor having a cylinder and a piston, the cylinder having a longitudinal passage on one side, the piston having a packing block and a hanger secured to one side and slidable in the said passage, the hanger extending above the top of the piston.

5. A motor, as claimed in claim 4, a gate mounted in the cylinder for transverse movement, the lower end of the gate and the upper end of the hanger being in substantial alignment at the bottom of the stroke of the piston to restrict the flow of gas into such passage.

6. A motor having a cylinder and a piston, there being a passage in the cylinder, the piston having a packing closure block adjacent its lower end and with a hanger, the block and the hanger operating in the said passage, the upper end of the hanger extending above the top of the piston, a gate transversely movable in the cylinder to increase and decrease the cross sectional area of the said passage, a rock shaft, and means interconnecting the gate and the shaft to positively move the gate in accordance with the movement of the said rock shaft.

7. A motor, as claimed in claim 6, the passage in the cylinder having a removable block with transverse recesses therein, the gate having lugs fitting therein, a stem connected to one of the lugs of the gate and slidable through the block and through the upper part of the cylinder with means positively connecting the stem and the rock shaft.

8. A motor having a cylinder and a piston, there being a passage between the cylinder and the piston with a pressure block in such passage, a gate slidable transversely to vary the cross sectional area of the passage, a rock shaft, and means interconnecting the rock shaft and the gate to positively move and position the gate in accordance with the movement and position of the rock shaft.

9. A motor comprising in combination a cylinder, a piston, a cylinder having a longitudinal passage, the piston having a packing closure block operating therein, a gate movable transversely to vary the cross sectional area of such passage, a rock shaft, and means positively interconnecting the rock shaft to shift the gate and position same in accordance with the movement and position of the rock shaft.

10. A motor, as claimed in claim 9, the piston having a hanger secured thereto and operating in the passage, the top of the hanger extending above the top of the piston.

11. A motor having in combination a cylinder, a piston, the cylinder having a longitudinal passage in one side, the piston having a pressure closure block secured thereto and operating in the said passage, the cylinder having a hand hole opening with a closure plate adjacent such passage to allow inspection and renewal of the said closure block.

12. A motor having in combination a cylinder and a piston therein, a combustion chamber above said piston, an elongated slot on the wall of the cylinder, said slot being open at one end and communicating with the combustion chamber, an obstruction on the piston adapted to be received in said slot, and a counter-balance weight on the piston substantially diametrically opposite the said obstruction.

13. A motor having a cylinder and a piston, there being a passage between the cylinder and the piston on one side, a pressure block on the piston operating in the said passage, means positively operative to increase or decrease the cross-sectional area of said passage, and a counter-balance weight on the piston substantially diametrically opposite the said pressure block.

In testimony whereof I have signed my name to this specification.

CLARENCE G. EDWARDS.